(12) United States Patent
Guo et al.

(10) Patent No.: US 11,924,184 B2
(45) Date of Patent: Mar. 5, 2024

(54) PROTECTION OF COMMUNICATIONS THROUGH USER EQUIPMENT RELAY

(71) Applicant: Apple Inc., Cupertino, CA (US)

(72) Inventors: Shu Guo, Beijing (CN); Fangli Xu, Beijing (CN); Yuqin Chen, Beijing (CN); Xiangying Yang, Cupertino, CA (US); Huarui Liang, Beijing (CN); Haijing Hu, Los Gatos, CA (US); Chunhai Yao, Beijing (CN); Dawei Zhang, Saratoga, CA (US); Yushu Zhang, Beijing (CN); Zhibin Wu, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 177 days.

(21) Appl. No.: 17/598,224

(22) PCT Filed: Jun. 15, 2021

(86) PCT No.: PCT/US2021/037399
§ 371 (c)(1),
(2) Date: Sep. 24, 2021

(87) PCT Pub. No.: WO2022/020033
PCT Pub. Date: Jan. 27, 2022

(65) Prior Publication Data
US 2022/0303254 A1    Sep. 22, 2022

(30) Foreign Application Priority Data

Jul. 23, 2020 (WO) ................ PCT/CN2020/103719

(51) Int. Cl.
*H04L 9/40* (2022.01)
*H04L 9/14* (2006.01)

(52) U.S. Cl.
CPC .............. *H04L 63/061* (2013.01); *H04L 9/14* (2013.01)

(58) Field of Classification Search
CPC ................................ H04L 63/061; H04L 9/14
See application file for complete search history.

(56) References Cited

U.S. PATENT DOCUMENTS

| 9,401,898 | B2 * | 7/2016 | Sauerwald | ............ H04L 9/0894 |
| 9,813,389 | B2 * | 11/2017 | Sauerwald | ............ H04L 9/0863 |
| 10,043,029 | B2 * | 8/2018 | Murray | ................ H04L 9/0618 |
| 10,298,555 | B2 * | 5/2019 | Murray | ................ H04L 63/061 |
| 11,108,753 | B2 * | 8/2021 | Murray | ................ H04L 9/0637 |

(Continued)

FOREIGN PATENT DOCUMENTS

EP    3577881 A1 * 12/2019 ........... H04L 63/061

OTHER PUBLICATIONS

InterDigital Inc, "Solution for Key Issue #4 Support of UE-to-UE Relay", Jan. 13-17, 2020, pp. 1-4. (Year: 2020).*

(Continued)

*Primary Examiner* — Yonas A Bayou
(74) *Attorney, Agent, or Firm* — Kilpatrick Townsend & Stockton LLP

(57) ABSTRACT

The present application relates to devices and components including apparatus, systems, and methods for secured user equipment communications over a user equipment relay. In some embodiments, symmetric or asymmetric encryption may be used for the secured user equipment communications.

20 Claims, 10 Drawing Sheets

(56) References Cited

U.S. PATENT DOCUMENTS

| | | | | |
|---|---|---|---|---|
| 2011/0252234 A1* | 10/2011 | De Atley | ............ | H04W 12/082 713/165 |
| 2012/0317409 A1* | 12/2012 | Revel | .................... | G06F 3/1265 713/150 |
| 2023/0007710 A1* | 1/2023 | Tenny | .................. | H04W 12/04 |

OTHER PUBLICATIONS

International Patent Application No. PCT/US2021/037399, "International Preliminary Report on Patentability", dated Feb. 2, 2023, 12 pages.
PCR: New Solution on Security Protection against UE-to-UE Relay, Apple, 3GPP TSG-SA WG3 Meeting #100e, S3-201910, Aug. 2020, 2 pages.
PCR: Security Policy for Unicast Message in PC5, Apple, 3GPP TSG-SA WG3 Meeting #98bis-e, S3-200824, Apr. 2020, 4 pages.
Proposed Text for General and Overview Clauses of NR PC5 Unicast Security, Qualcomm Incorporated, 3GPP TSG-SA3 Meeting #98e, S3-200501, Mar. 2020, 3 pages.
Solution for Key Issue #4 Support of UE-to-UE Relay, InterDigital Inc., SA WG2 Meeting #136AH, S2-2001488, Jan. 17, 2020, 4 pages.
International Patent Application No. PCT/US2021/037399, International Search Report and the Written Opinion, dated Sep. 17, 2021, 17 pages.
3rd Generation Partnership Project; Technical Specification Group Services and System Aspects; Architecture enhancements for 5G System (5GS) to support Vehicle-to-Everything (V2X) services (Release 16), 3GPP TS 23.287 V16.3.0, Jul. 2020, 57 pages.
3rd Generation Partnership Project; Technical Specification Group Services and System Aspects; Proximity-based services (ProSe); Stage 2 (Release 16), 3GPP TS 23.303 V16.0.0, Jul. 2020, 130 pages.
3rd Generation Partnership Project; Technical Specification Group Services and System Aspects; Study on system enhancement for Proximity based Services (ProSe) in the 5G System (5GS) (Release 17), 3GPP TS 23.752 V0.4.0, Jun. 2020, 121 pages.
3rd Generation Partnership Project; Technical Specification Group Core Network and Terminals; Proximity-services (ProSe) User Equipment (UE) to ProSe function protocol aspects; Stage 3 (Release 17), 3GPP TS 24.334 V16.0.0, Jul. 2020, 260 pages.

* cited by examiner

PROTECTION OF COMMUNICATIONS THROUGH USER EQUIPMENT RELAY

CROSS REFERENCE TO RELATED APPLICATIONS

This application is a 371 U.S. National Phase of PCT International Patent Application No. PCT/US2021/037399, filed Jun. 15, 2021, which claims the benefit of PCT International Patent Application No. PCT/CN2020/103719, filed Jul. 23, 2020, which are hereby incorporated by reference in their entireties for all purposes.

BACKGROUND

Third Generation Partnership Project (3G-PP) describes a variety of proximity services (ProSe) architectures, signaling procedures, and use cases. Additional considerations may need to be addressed to effectively integrate ProSe-enabled user equipments (UEs) into 3GPP New Radio (NR) networks.

DETAILED DESCRIPTION

Figure 1:
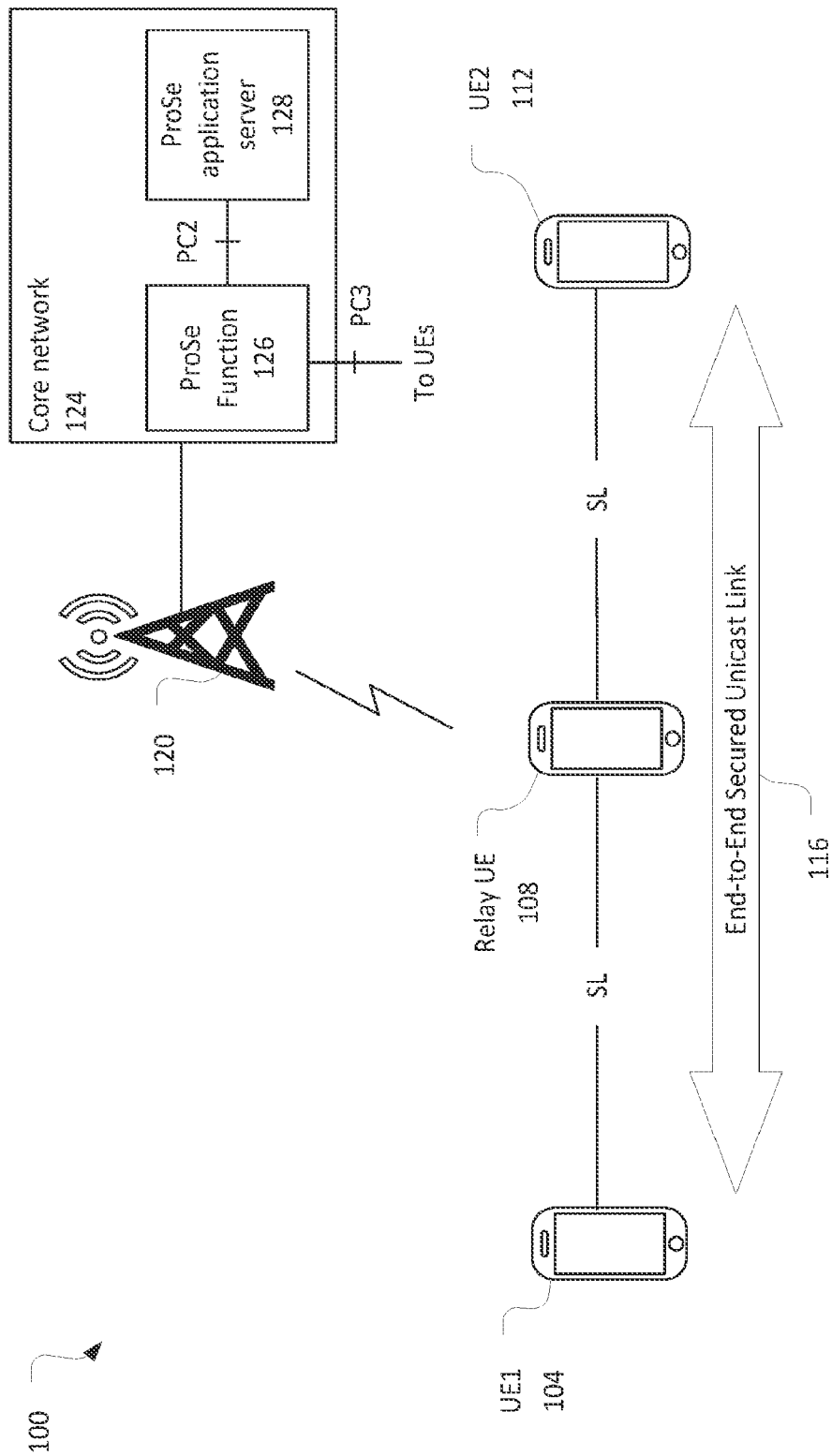
FIG. 1 illustrates a network environment in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrase "A or B" means (A), (B), or (A and B)

The following is a glossary of terms that may be used in this disclosure.

The term "circuitry" as used herein refers to, is part of, or includes hardware components such as an electronic circuit, a logic circuit, a processor (shared, dedicated, or group) and/or memory (shared, dedicated, or group), an Application Specific integrated Circuit (ASIC), a field-programmable device (FPD) (e.g., a field-programmable gate array (FPGA)), a programmable logic device (PLD), a complex PLD (CPLD), a high-capacity PLD (HCPLD), a structured ASIC, or a programmable system-on-a-chip (SoC), digital signal processors (DSPs), etc., that are configured to provide the described functionality. In some embodiments, the circuitry may execute one or more software or firmware programs to provide at least some of the described functionality. The term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

The term "processor circuitry" as used herein refers to, is part of, or includes circuitry capable of sequentially and automatically carrying out a sequence of arithmetic or logical operations, or recording, storing, and/or transferring digital data. The term "processor circuitry" may refer an application processor, baseband processor, a central processing unit (CPU), a graphics processing unit, a single-core processor, a dual-core processor, a triple-core processor, a quad-core processor, and/or any other device capable of executing or otherwise operating computer-executable instructions, such as program code, software modules, and/or functional processes.

The term "interface circuitry" as used herein refers to, is part of, or includes circuitry that enables the exchange of information between two or more components or devices. The term "interface circuitry" may refer to one or more hardware interfaces, for example, buses, I/O interfaces, peripheral component interfaces, network interface cards, and/or the like.

The term "user equipment" or "UE" as used herein refers to a device with radio communication capabilities and may describe a remote user of network resources in a communications network. The term "user equipment" or "UE" may be considered synonymous to, and may be referred to as, client, mobile, mobile device, mobile terminal, user terminal, mobile unit, mobile station, mobile user, subscriber, user, remote station, access agent, user agent, receiver, radio equipment, reconfigurable radio equipment, reconfigurable mobile device, etc. Furthermore, the term "user equipment" or "UE" may include any type of wireless/wired device or any computing device including a wireless communications interface.

The term "computer system" as used herein refers to any type interconnected electronic devices, computer devices, or components thereof. Additionally, the term "computer system" and/or "system" may refer to various components of a computer that are communicatively coupled with one another. Furthermore, the term "computer system" and/or "system" may refer to multiple computer devices and/or multiple computing systems that are communicatively coupled with one another and configured to share computing and/or networking resources.

The term "resource" as used herein refers to a physical or virtual device, a physical or virtual component within a computing environment, and/or a physical or virtual component within a particular device, such as computer devices, mechanical devices, memory space, processor/CPU time, processor/CPU usage, processor and accelerator loads, hardware time or usage, electrical power, input/output operations, ports or network sockets, channel/link allocation, throughput, memory usage, storage, network, database and applications, workload units, and/or the like. A "hardware resource" may refer to compute, storage, and/or network resources provided by physical hardware element(s). A "virtualized resource" may refer to compute, storage, and/or network resources provided by virtualization infrastructure to an application, device, system, etc. The term "network resource" or "communication resource" may refer to resources that are accessible by computer devices/systems via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

The term "channel" as used herein refers to any transmission medium, either tangible or intangible, which is used to communicate data or a data stream. The term "channel" may be synonymous with and/or equivalent to communications channel, data communications channel, transmission channel, data transmission channel, access channel, data access channel, link, data link, carrier, radiofrequency carrier, and/or any other like term denoting a pathway or medium through which data is communicated. Additionally, the term "link" as used herein refers to a connection between two devices for the purpose of transmitting and receiving information.

The terms "instantiate," "instantiation," and the like as used herein refers to the creation of an instance. An "instance" also refers to a concrete occurrence of an object, which may occur, for example, during execution of program code.

The term "connected" may mean that two or more elements, at a common communication protocol layer, have an established signaling relationship with one another over a communication channel, link, interface, or reference point.

The term "network element" as used herein refers to physical or virtualized equipment and/or infrastructure used to provide wired or wireless communication network services. The term "network element" may be considered synonymous to and/or referred to as a networked computer, networking hardware, network equipment, network node, virtualized network function, and/or the like.

The term "information element" refers to a structural element containing one or more fields. The term "field" refers to individual contents of an information element, or a data element that contains content. An information element may include one or more additional information elements.

FIG. 1 illustrates a network environment 100 in accordance with some embodiments. The network environment 100 may include a plurality of UEs including, for example, UE1 104, UE-to-UE relay UE 108 (or simply, relay UE 108), and UE2 112. The UEs may operate in accordance with, or in a manner compatible to, Long Term Evolution (LTE,) or Fifth Generation (5G) NR system standards as provided by 3GPP technical specifications.

The UEs of the network environment 100 may be configured for proximity services (ProSe) communications in which the UEs may communicate directly with one another without the communications traversing through an access node 120 that provides a radio access network cell. The UEs may be mobile phones, consumer electronic devices, tablet computers, wearable computer devices, vehicular computer devices, infrastructure equipment, sensors etc.

One or more of the UEs may communicate with an access node 120 that provides a wireless access cell, for example, an LTE cell or an NR cell. The access node 800 may be an eNB providing an LTE access cell and being coupled with an evolved packet core (EPC) network; an ng-eNB providing an LTE access cell and coupled with a 5G core network (5GC,) or a gNB providing an NR access cell and coupled with a 5GC.

The access node 120 may be coupled with a core network 124, which may be an EPC or a 5GC, to provide the UEs with services. The core network 124 may include network elements configured to offer various data and telecommunications services to customers/subscribers (for example, users of UEs) who are connected to the core network 124 via an access cell provided by access node 120. The components of the core network 124 may be implemented in one physical node or separate physical nodes including components to read and execute instructions from a machine-readable or computer-readable medium (for example, a machine-readable storage medium). In some embodiments, network function virtualization (NFV) may be utilized to virtualize any or all of the above-described network node functions via executable instructions stored in one or more computer-readable storage mediums (described in further detail below). A logical instantiation of the core network 124 may be referred to as a network slice, and a logical instantiation of a portion of the core network 124 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more components/functions.

The core network 124 may include a ProSe function 126 that is a logical function used for network-related actions related to ProSe operations. The ProSe function 126 may interface with UEs through a PC3 interface and with a ProSe application server 128 through a PC2 interface.

The ProSe function 126 may control a direct provisioning function (DPF) used to provision a UE with necessary parameters in order to use ProSe direct discovery in ProSe direct communication. The DPF may provision UEs with public land mobile network (PLMN) specific parameters that allow the UE to use ProSe in a particular PLMN. The DPF may also provision a UE with parameters that may be used for direct communication when the UE is not served by radio access network cell. The ProSe function 126 may also include a direct discovery name management function for open ProSe direct discovery to allocate and process the mapping of ProSe applications identifiers and ProSe application codes used in ProSe direct discovery.

The ProSe application server 128 may store and manage various ProSe identifiers, metadata, and authorizations related to various discovery operations.

At a particular time, the UEs may be within or out of coverage of a radio access network cell provided by an access node such as access node 120. For example, at a given time the UEs of the network environment 100 may be in a full-coverage scenario (for example, all UEs are within cell coverage), partial-coverage scenario (for example, a subset of the UEs may be within cell coverage), or out-of-coverage scenarios (for example, no UEs are within cell coverage).

The UEs may communicate with one another over sidelink (SL) interfaces. An SL interface may alternatively be referred to as a ProSe interface, device-to-device (D2D) interface, or a PC5 interface or reference point.

In some embodiments, the network environment 100 may be deployed within a vehicular communication system. In a vehicular communication system the UEs may communicate with one another using cellular vehicle-to-everything (V2X) communications. V2X may involve vehicle-to-vehicle (V2V,) vehicle-to-infrastructure (V2I,) vehicle-to-network (VTN,) or vehicle-to-pedestrian (V2P) communications.

In some embodiments, the UE1 104 may wish to establish a secure association with the UE2 112 through an end-to-end secured unicast link. However, given proximity or other considerations, the UEs 104 and 112 may not be capable of efficiently communicating directly with one another and may instead communicate through relay UE 108. Various embodiments describe how the UEs 104 and 112 may establish the secure association via the relay UE 108.

In embodiments in which the UE1 104 initiates the procedure to establish the connection it may be referred to as the initiating or source UE. The UE2 112 in this case may be referred to as the receiving or target UE.

The relay UE 108 may enable the UE-to-UE relay by facilitating discovery or serving as a repeater/amplifier. To provide these functions, the relay UE 108 may need to know routing information with respect to the UEs 104 and 112. However, it may be desired that the relay UE 108 does not have visibility into the content of the subsequent communications, as there may not exist a secure relationship between the UE 108 and either or both of the UEs 104 and 112. Thus, various embodiments describe security related procedures to be used in establishing an end-to-end secured unicast link 116. These procedures may include the UEs 104 and 112 negotiating a security context via the relay UE 108 without the relay UE 108 knowing or discovering information about the security context itself.

Except for modifications and improvements described herein, the embodiments of the present disclosure may be compatible with UE-to-UE connection procedures described in 3GPP Technical Report (TR) 23.752, v0.4.0 (2020-06). While some embodiments are described with respect to a solution consistent with clause 6.9 of TR 23.752, the security establishment principles described herein may be used with respect to other connection procedures including those described in other clauses in TR 23.752.

Figure 2:
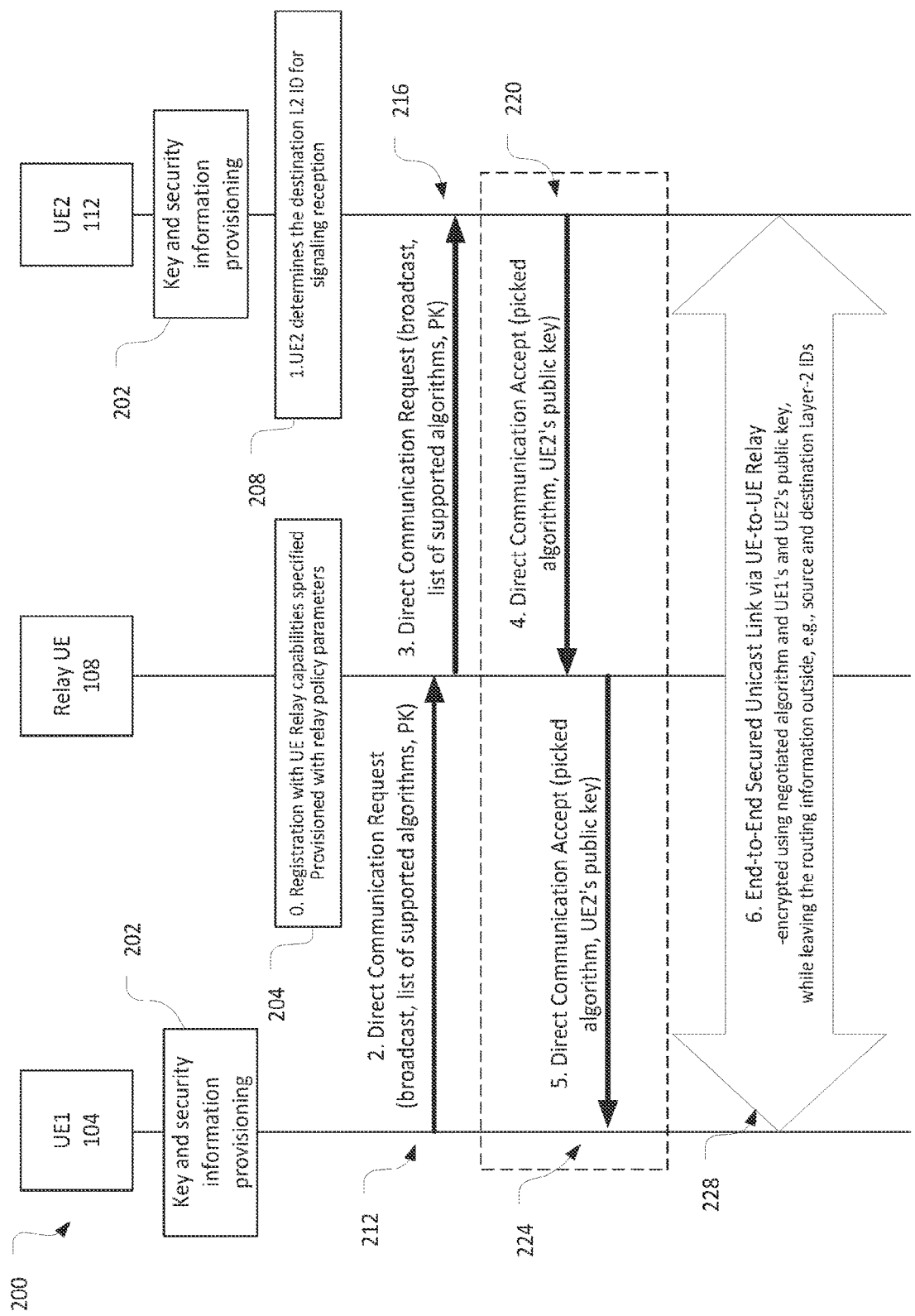
FIG. 2 illustrates a procedure to establish a secure connection in accordance with some embodiments.

FIG. 2 illustrates a procedure 200 to establish a connection in accordance with some embodiments. In procedure 200, the UEs 104 and 112 may utilize asymmetric cryptography to encrypt their communication and avoid leaking information to the relay UE 108.

In some embodiments, the asymmetric cryptography used by the UEs 104 and 112 may be based on a public-key cryptography in which public keys may be shared throughout a system (for example, through broadcast messages), while private keys are known only to the owner. A communication encrypted with a UE's public key can only be decrypted using the UE's private key.

The algorithms used for the asymmetric cryptography may include, but are not limited to, Rivest-Shamir-Adleman (RSA,) elliptic-curve cryptography (ECC,) is identity-based cryptography (for example, SM9), etc.

At 202, the procedure 200 may include provisioning the UEs with keys and any other security information that may be used for the asymmetric cryptography (for example, security algorithms, credentials, etc.). In various embodiments, the UEs may be provided with the public/private keys themselves, or information to generate the public/private keys such as a key generation program.

In some embodiments, some or all of the provisioning may be done by a network element such as, for example, ProSe function 126. In other embodiments, a UE may be pre-provisioned with some or all of the key/credential information. For example, in embodiments that rely on identity-based cryptography, the public keys may be based on the identity of the UEs themselves. Thus, in some of these embodiments a UE may not need additional information regarding the public key. In these situations, the UE may be considered as pre-provisioned with the information related to the public-key.

At 204, the procedure 200 may include the relay UE 108 registering with the network (for example, access node 120 or core network 124) and providing the network with its UE relay capabilities. The network may then provision the relay UE 108 with relay policy parameters and a unique relay identifier (ID.)

At 208, the UE2 112 may determine a destination Layer-2 ID for signaling reception for PC-5 link establishment. This may be similar to that described in clause 5.6.1.4 of 3GPP Technical Specification (TS) 23.287 v16.3.0 (2020-07-09). The UE2 112 may be configured with the destination Layer-2 ID as described in, for example, TS 23,287, clause 5.1.2.1.

At 212, an application layer of the UE1 104 may provide information to a ProSe layer of the UE1 104 for PC5 unicast communication. The information may include, for example, a broadcast Layer-2 ID, a ProSe Application ID, an application layer ID of the UE1 104, an application layer ID of the UE2 112, and a relay applicable indication. The provision of this information may be similar to that described in, for example, TS 23.287, clause 6.3.3.1. Subsequent to the provision of this information, the ProSe layer of the UE1 104 may send (for example, broadcast) a direct communication request message to trigger a peer UE discovery process. The direct communication request message may be sent using the source Layer-2 ID and broadcast Layer-2 ID as destination. The UE1 104 may also include other parameters in the direct communication request as described in, for example, TS 23.287, clause 6.3.3.1.

The UE1 104 may also generate, the direct communication request to include a first information element (IE) that includes a list of supported security algorithms and a second IE that includes a public key of the UE1 104. The list of supported security algorithms may indicate the security algorithms that the UE1 supports and may be used as a basis for negotiating the asymmetric algorithm that may be used by both the UEs 104 and 112. In some embodiments, the negotiation of the asymmetric algorithm may be omitted in embodiments in which the UEs are mandated to support one or more specific algorithms.

At 216, the relay UE 108 may receive the broadcast direct communication request message and verify whether it is configured to relay this application. This verification may include, for example, comparing the announced ProSe Application ID with its provisioned relay policy parameters. If the ProSe Application ID matches the provisioned relay policy parameters, the relay ID 108 may assign itself a Relay-Layer-2 ID (for example, a R-L2 ID-a) for UE1 104. This Relay-Layer-2-ID may be related to, or otherwise associated with, the L2 ID of UE1 104 in, for example, a mapping table at the relay UE 108.

Upon verifying that the relay UE 108 is configured to relay this application, the relay UE 108 may forward the direct communication request, along with the IEs that include the list of supported security algorithms and the public key of the UE1 104, to the UE2 112.

At 220, the UE2 112, which is interested in the announced application, may check to determine whether it could support one or more of the security algorithms in the direct communication request. If so, the UE2 112 may generate, as a response to the direct communication request, a direct communication accept message. The direct communication accept message may include at least one security algorithm selected from the algorithms in the direct communication request, that it supports and a public key of the UE2 112. The indication of the supported algorithm and the public key may be disposed in respective IEs. The UE2 112 may send the direct communication request message to the relay UE 108.

The relay UE 108 may set a source field of the message to R-L2-ID-b as found in the mapping table and may set a destination field to the L2 ID of the UE1 104 as found in the mapping table. The relay UE 108 may then forward the modified message to the UE1 104 at 224.

At 228, an extended and end-to-end secured unicast link is formed via the relay UE 108. This extended unicast link is secured end-to-end using the public keys of the UEs 104 and 112, while the routing information, which include Layer-2 IDs, will be left outside of the secured unicast link in the clear.

For example, the messages transmitted over the secured unicast link may be secured and opaque to the relay UE 108. However, in some embodiments, routing information corresponding to the messages (for example, Layer-2 IDs) may be unsecured and visible to the relay UE 108. These IDs, which may be stored in the mapping table at the relay UE 108, may be available to the relay UE 108 so that it may fulfil its routing operations. So, while the message itself may be opaque to the relay UE 108, the L2-IDs of the UEs 104 and 112 may be accessible.

In this manner, confidential, integrity-protected, or replay-protected messages (for example, data or PC5—signaling ("PC5-S") may be securely transmitted within the secured unicast link between the UE1 104 and UE2 112, without compromising the relay functionality provided by the relay UE 108.

Figure 3:
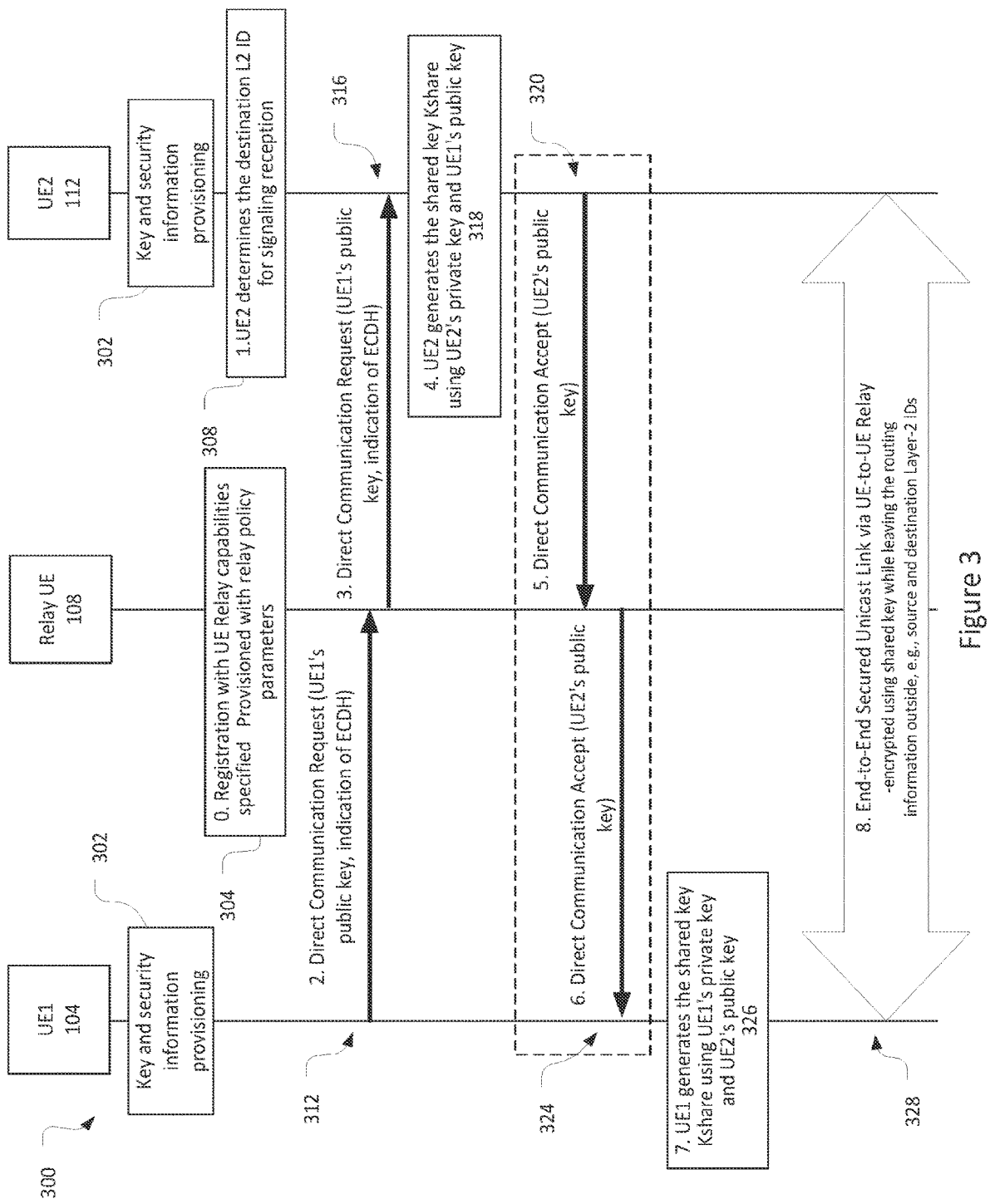
FIG. 3 illustrates a procedure to establish a secure connection in accordance with sonic embodiments.

FIG. 3 illustrates a procedure 300 for establishing a connection in accordance with sonic embodiments. The procedure 300 may utilize symmetric cryptography based on a symmetric-key cipher to secure the communication channel between the UE1 104 and the UE2 112.

The procedure 300 may include, at 302, a provisioning operation similar to that described above with respect to operation 202 of FIG. 2. However, at 302, the UEs may be configured with information to configure symmetric cryptography.

In sonic embodiments, the UEs may be configured with information to provide a Diffie-Hellman key agreement protocol. The information configured to the UEs may include security algorithms, for example, cipher suites that provide a set of algorithms that may be used to secure the connection. The information may also include credentials, which may include anything needed to perform an associated security algorithm. For example, a prime and integer may be the security credentials that may be used to perform a Diffie-Hellman security algorithm.

The Diffie-Hellman key agreement protocol may rely on keys generated using cryptographic algorithms based on mathematical problems to produce one-way functions. For example, the UEs may be configured with security credentials that include a prime modulus and a generator and an unpredictable number (typically large and random) as the private key. Consider UE1 104 having a private key (PRK1); the UE2 112 having a private key (PRK2); the prime modulus (PM); and generator (G.) The UE1 104 may determine its public key (PBK1) based on $G^{PRK1}$modPM and send PBK1 to the UE2 112. The UE2 112 may determine its public key (PBK2) based on $G^{PRK2}$modulusPM and send PBK2 to the first UE. The first UE may then determine a shared key (Kshare) as a result of $PBK2^{PRK1}$modPM; and the UE2 may determine the same shared key (Kshare) as a result of $PBK1^{PRK2}$mod PM. The shared secret (Kshare) may be used directly as a key, or may be used to derive another key, to encrypt subsequent communications using a symmetric-key cipher. Without knowledge of the private keys, the relay UE 108 may be unable to derive the shared key.

In some embodiments, the UEs may be configured with elliptic-curve public-private key pairs and any other credentials that may be need to be used in an elliptic-curve Diffie-Hellman (ECDH) key agreement protocol, which may be a variant of the Diffie Hellman protocol using elliptic-curve cryptography. In some embodiments, the security credentials may correspond to a plurality of elliptic curves that may be used with the ECDH key agreement protocol. In general, elliptic curve protocols such as ECDH provide shorter encryption keys that use fewer memory and CPU resources as compared to, for example, RSA, in order to obtain comparable security.

Operations 304 and 308 may be similar to respective operations 204 and 208 of FIG. 2.

At 312, the procedure may include the UE1 104 generating a direct communication request message to include a public key of the UE1 104. Because the direct communication request message is to be broadcast, and not all targeting UEs may support ECDH, the UE1 104 may also include an ECDH indication within the direct communication request message. In this manner, a receiving UE may know that the security algorithm to be used to establish a secured connection is the ECDH key agreement protocol. The direct communication request message may be transmitted to the relay UE 108, which forwards the direct communication request message, which includes the public key of the UE1 104 and the indication of the ECDH, to the UE2 112 at 316. The forwarding of the direct communication request message may be similar to that described above with respect to 216.

At 318, the UE2 112 may process the direct communication request message to obtain the transmitted information. If the UE2 112 supports ECDH key agreement protocol, the UE2 112 may proceed to generate a shared key (Kshare) using a private key of the UE2 112 and the public key of the UE1 104 according to the ECDH key agreement protocol.

At 320, the UE2 112 may generate a direct communication accept message that includes a public key of the UE2 112 and transmit the direct communication accept message to the relay UE 108. The relay UE 108 may forward the direct communication accept message to the UE1 104 at 324. The forwarding of the direct communication accept message may be similar to that described above with respect to 324.

At 326, the UE1 104 may generate the shared key (Kshare) using the private key of the UE1 104 and the public key of the UE2 112 according to the ECDH key agreement protocol. At this point, both the UE1 104 and the UE2 112 may have access to the same shared key.

At 328, the end-to-end secured unicast link may be established via the relay UE 108. Communications over the unicast link may be encrypted using Kshare that is available to both the UE1 104 and the UE2 112 and the routing information may be left outside of the secured unicast link.

Figure 4:
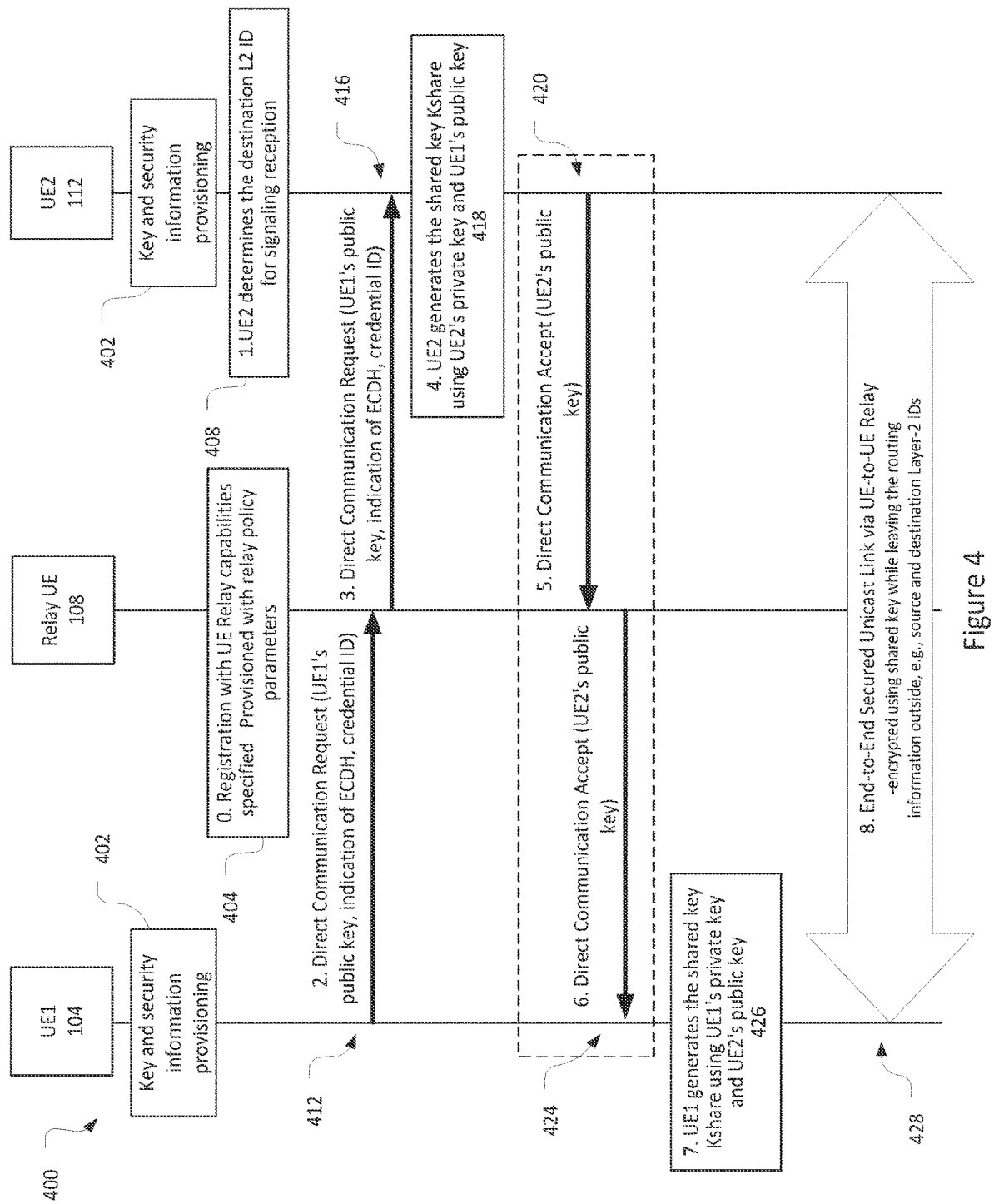
FIG. 4 illustrates a procedure to establish a secure connection in accordance with some embodiments.
Figure 5:
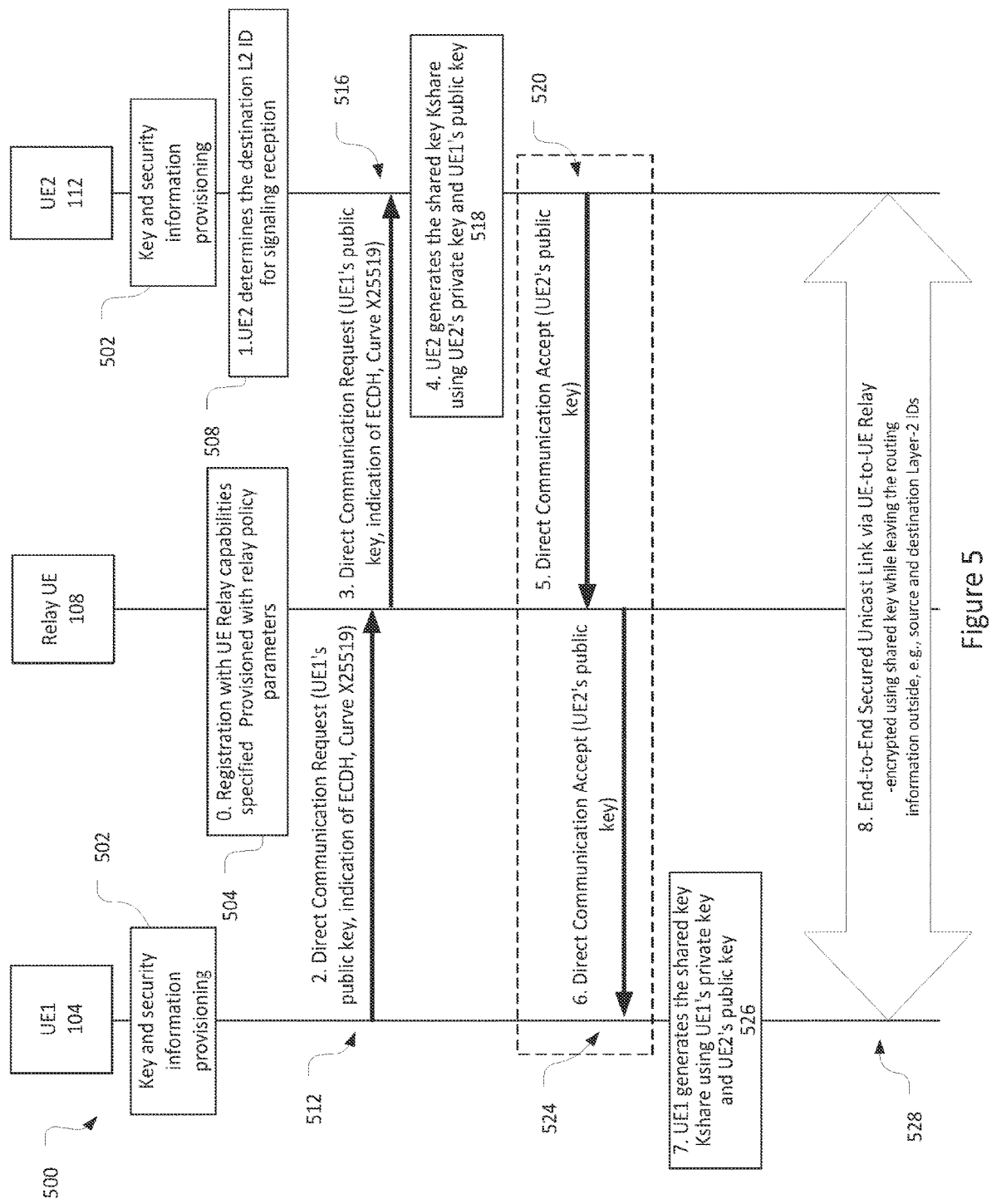
FIG. 5 illustrates a procedure to establish a secure connection in accordance with some embodiments.

In some embodiments, the credentials provisioned to the UEs 104 and 112 at 302 may include a number of elliptical curves that may be used in the ECDH key agreement protocol. These elliptical curves may be, for example, a secp256k1 curve, X25519 (or Curve25519), X448 (or Curve448), etc. Provisioning the UEs 104 and 112 with a number of options for utilizing the ECDH key agreement protocol may lead to uncertainty about the credentials that are used in a specific instance. Therefore, some embodiments may also include negotiations or other configurations that may cause the UEs 104 and 112 to align on common credentials that are to be used with the ECDH key agreement protocol. FIGS. 4 and 5 illustrate procedures that may allow the UEs 104 and 112 to negotiate a specific credential that may be used to generate a shared key to secure connections.

FIG. 4 illustrates a procedure 400 for establishing a connection in accordance with some embodiments. Like procedure 300, procedure 400 may utilize symmetric cryptography based on an ECDH key agreement protocol.

Operations 402, 404, and 408 may be similar to respective operations 302, 304, and 308 as described with respect to FIG. 3.

At 412, the procedure 400 may include the UE1 104 generating a direct communication request message to include a public key of the UE1 104 and an indication of ECDH key agreement protocol as described above with respect to operation 312. However, the direct communication request message generated at 412 may also include a credential ID to facilitate a negotiation of an ECDH credential configuration.

The ProSe application of the UE1 104 may implement a plurality of credentials for ECDH, which may have been provisioned in the key and security information provisioning at 402. Additionally, other UES that have installed a ProSe application may also be capable of implementing various credentials. In some embodiments, each UE that installs the ProSe application may also have downloaded credentials and an associated credential ID. This association information may additionally/alternatively be communicated to the UEs 104 and 112 through the key and security information provisioning at 402. Thus, the inclusion of the credential ID in the direct communication request message generated by the UE1 104 at 412, may uniquely identify a provisioned credential that will be used for ECDH key agreement protocol. Transmission of the credential ID may protect an identity of the underlying credential, at least with respect to devices that have not downloaded the same application. Furthermore, transmission of the credential ID as opposed to the credential itself may also use less control signaling overhead.

At 416, the procedure 400 may include the relay UE 108 forwarding, to the UE2 112, the direct communication request message with the public key of the UE1 104, the indication of ECDH, and the credential ID. The forwarding of the direct communication request message may be similar to that described above with respect to 216.

The UE2 112 may process the direct communication request to receive the transmitted information including the credential ID. At 418, the procedure 400 may include the UE2 112 generating, based on the credential corresponding to the credential ID, the shared key using the private key of the UE2 112 and the public key of the UE1 104 with the ECDH key agreement protocol.

The procedure 400 may further include operations 420, 424, 426, and 428 that may be similar to respective operations 320, 324, 326, and 328 described above with respect to FIG. 3.

FIG. 5 illustrates a procedure 500 for establishing a connection in accordance with sonic embodiments. Like procedures 300 and 400, procedure 500 may utilize symmetric cryptography based on an ECDH key agreement protocol.

Operations 502, 504, and 508 may be similar to respective operations 302, 304, and 308 as described with respect to FIG. 3.

At 512, the procedure 500 may include the UE1 104 generating a direct communication request message to include a public key of the UE1 104 and an indication of ECDH as described above with respect to operation 412.

The security credentials (for example, the elliptic curves) may not be private information. Therefore, in this embodiment, rather than the credential ID being included in the direct communication request message, the credential itself may be included. For example, as shown in FIG. 5, the UE1 104 may generate the direct communication request message to include an indication that curve X25519 is to be used.

At 516, the procedure 500 may include the relay UE 108 forwarding, to the UE2 112, the direct communication request message with the public key of the UE1 104, the indication of ECDH, and the credential to be used (for example, curve X25519). The forwarding of the direct communication request message may be similar to that described above with respect to 216.

The UE2 112 may process the direct communication request to receive the transmitted information including the credential. If the UE2 112 supports the credential the procedure 500 may include, at 518, the UE2 112 generating, based on the credential, the shared key using the private key of the UE2 112 and the public key of the UE1 104 with the ECDH key agreement protocol.

The procedure 500 may further include operations 520, 524, 526, and 528 that may be similar to respective operations 420, 424, 426, and 428 described above with respect to FIG. 4.

Procedures 400 and 500 describe the UEs 104 and 112 determining which credential of a plurality provisioned credentials are to be used to establish a shared key to secure an extended unicast link. In other embodiments, the negotiations of procedures 400 and 500 may be avoided by limiting the number of provisioned credentials. For example, UEs may only be configured with one credential (for example, curve X25519) that is supported for ProSe. Thus, the UEs may not need to negotiate which credential to use.

Figure 6:
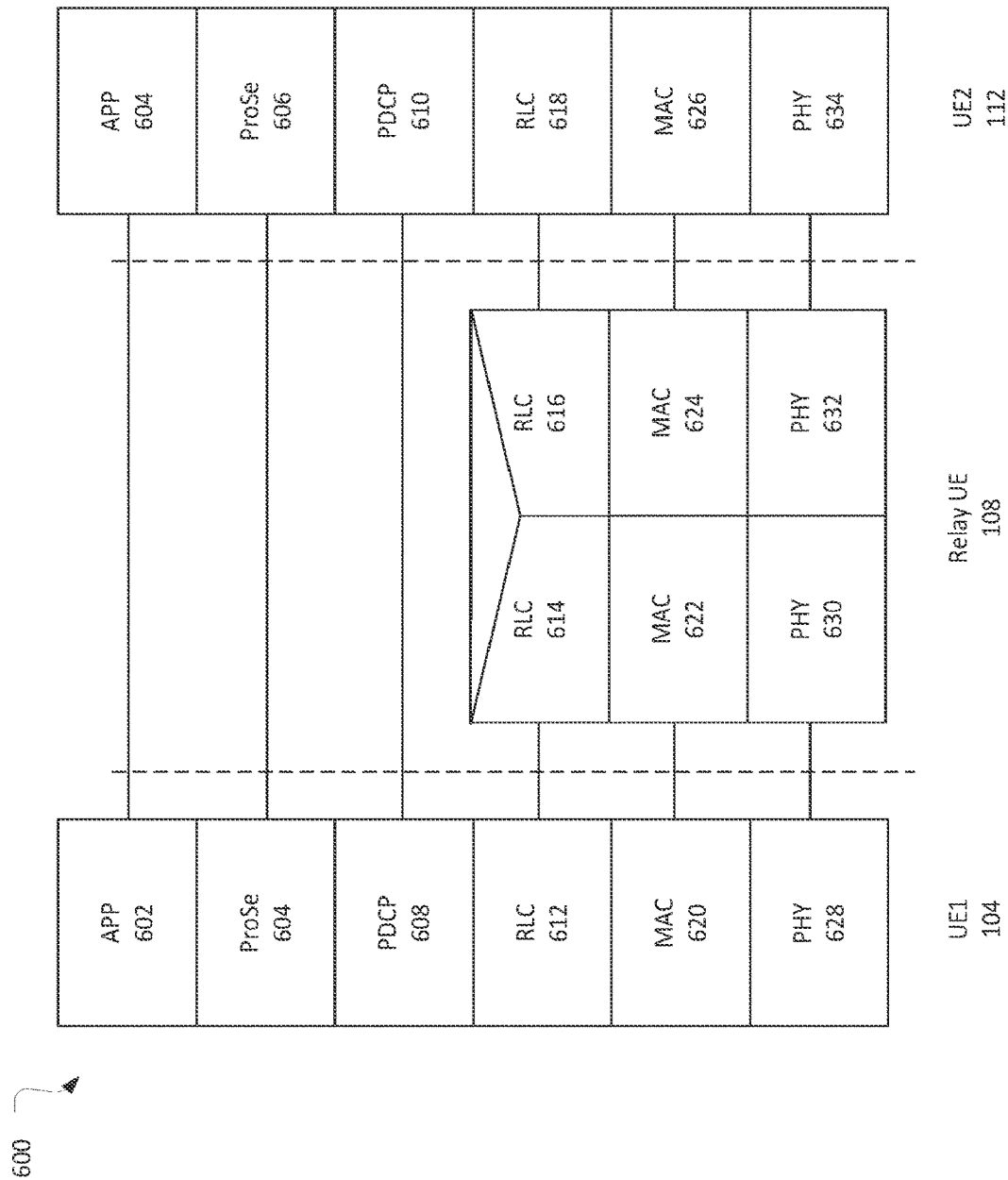
FIG. 6 illustrates protocol stacks that may be implemented by user equipments in accordance with some embodiments.

FIG. 6 illustrates protocol stacks 600 that may be implemented by UEs in accordance with some embodiments. The control-plane protocol stack 600 may provide a UE-to-UE Layer-2 relay.

UE1 104 may include an application (APP) layer 602 coupled with a corresponding APP layer 604 of the UE2 112. The APP layers may use lower layers to provide a data transfer service.

The UE1 104 may include a ProSe layer 604 coupled with a corresponding ProSe layer 606 of the UE2 112.

The ProSe layers may be used to establish secured connections as described herein. The ProSe layer may perform a variety of other ProSe operations including those that may terminate at one or more other ProSe elements within a network. The additional ProSe operations may include, for example, those that involve ProSe signaling of control information with other ProSe-enabled UEs over PC5-signaling (PC5-S) interface; ProSe discovery operations to discover other ProSe-enabled UEs over a PC5-discovery (PC5-D)) interface; service authorization, configuration, provisioning with a ProSe function over a PC3 interface; etc.

In the control plane, the ProSe layer may further perform one or more radio resource control (RRC) layer operations. For example, the ProSe layer may provide connection establishment and release functions, broadcast of system information, radio bearer establishment, reconfiguration and release, mobility, and paging functions.

In the data plane, the ProSe layers may perform service data adoption protocol (SDAP) layer operations. SDAP layers operations may include mapping between quality of service (QoS) flows and data radio bears and marking QoS flow identifiers and both downlink and uplink packets.

The UE1 104 may further include a packet data convergence protocol (PDCP) layer 608 coupled with a corresponding PDCP layer 610 of the UE2 112. The PDCP layers may control transfer user/control plane data, header compression, ciphering, and integrity protection. The PDCP layers may establish the end-to-end security between the UEs 104 and 112. This may allow signaling messages to be transparently transferred between the UEs 104 and 112 over the relay UE 108 without any modification other than the source and destination Layer-2 IDs.

The UE1 104 may further include a radio link control (RLC) layer 612 coupled with a corresponding RLC layer 614 in the relay UE 108. The relay UE 108 may also include another RLC layer 616 coupled with corresponding RLC layer 618 in the UE2 112.

The RLC layers may transfer upper layer protocol data units and an acknowledged mode, unacknowledged mode, or transparent mode. The RLC layers may manage RLC service data units and protocol data units separately for each of these modes to provide error detection and recovery.

The UE1 104 may further include a media access control (MAC) layer 620 coupled with a corresponding MAC layer 622 in the relay UE 108. The relay UE 108 may also include another MAC layer 624 coupled with corresponding MAC layer 626 in the UE2 112.

The MAC layers may perform mapping between logical channels and transport channels for sidelink transmitter (TX) and receiver (RX"; multiplexing for sidelink TX; demultiplexing for sidelink RX; schedule information reporting for sidelink TX; error correction through hybrid automatic repeat request (HARQ) for sidelink TX/RX; logical channel prioritization for sidelink TX; and radio resource selection for sidelink TX.

The MAC layers, which may be at Layer 2, may also manage various aspects of routing with the L2 IDs as described in the procedures 200, 300, 400, and 500. For example, the MAC layers of the relay UE 108 may manage the mapping table that associates R-L2 ID-a with the L2 ID of the UE1 104 and R-L2 ID-L with the L2 ID of UE2 112 and the updating of the routing information in the messages forwarded to the UE1 104 and the UE2 112.

The UE1 104 may further include a physical (PHY) layer 628 coupled with a corresponding PHY layer 630 in the relay UE 108. The relay UE 108 may also include another PHY layer 632 coupled with corresponding PHY layer 634 in the UE2 112.

The PHY layers, which may also be referred to as Layer 1 (L1,) provides for physical layer processing as well as transmission and reception across an air interface. The PHY layers may add cyclic redundancy check bits to transport blocks at a transmitter to allow error detection at a receiver. The PHY layers may also perform channel coding, interleaving, and modulation to efficiently transmit/receive information over the air interface.

Figure 7:
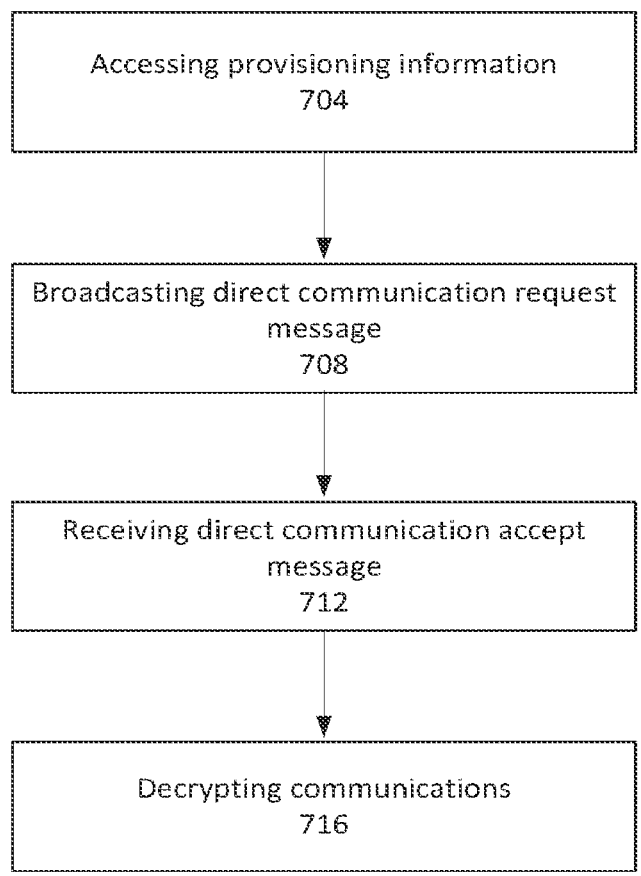
FIG. 7 illustrates an operational flow/algorithmic structure in accordance with some embodiments.

FIG. 7 may include an operation flow/algorithmic structure 700 in accordance with some embodiments. The operation flow/algorithmic structure 700 may be used by an initiating UE to establish a secured unicast link between two UEs via a relay UE.

In some embodiments, the operation flow/algorithmic structure 700 may be performed by an initiating UE such as, for example, UE1 104, UE 1000, or components thereof, for example, baseband processors of processors 704.

The operation flow/algorithmic structure 700 may include, at 704, accessing provisioning information. The provisioning information may be accessed from memory/storage of the device, for example, memory/storage 1012.

In some embodiments, the provisioning information may be provisioned to the UE through configuration messages transmitted from a network element such as, but not limited to, a ProSe function such as ProSe function 126. In other embodiments, some or all of the provisioning information may be pre-provisioned or preconfigured at the UE.

In various embodiments, the provisioning information may include identity information, key information, security credential information, etc.

The operation flow/algorithmic structure 700 may further include, at 708, broadcasting a direct communication request message. The direct communication request message may be broadcast to initiate a peer UE discovery process. The broadcasting of the direct communication request message may be accomplished by using a broadcast L-2 address as a destination address in the direct communication request message.

In various embodiments, the direct communication request may be generated to include asymmetric or symmetric cryptography information that may be used to secure a unicast link that results from the peer UE discovery process. This cryptography information may include, for example, a list of supported security algorithms, public key information of the initiating UE, an indication that an ECDH key agreement protocol is to be used for symmetrical encryption, an indication (for example, identifier or name) of a security credential that is to be used with the ECDH key agreement protocol, etc.

The operation flow/algorithmic structure 700 may further include, at 712, receiving a direct communication accept message. In various embodiments, the direct communication accept message may include public key information of the receiving UE and, optionally, a security algorithm selected by the receiving UE. In some embodiments, the direct communication accept message may be encrypted based on the public key of the initiating UE.

The operation flow/algorithmic structure 700 may further include, at 716, decrypting the communications. In embodiments utilizing asymmetric cryptography, the decrypting of the communications at 716 may involve decrypting a message received from the receiving UE, for example the direct communication accept message or other messages, based on a private key of the initiating UE.

In embodiments utilizing symmetric cryptography, the initiating UE may generate a shared key based on information transmitted in the direct communication accept message, including for example, a public key of the receiving UE. Subsequent communications from the receiving UE may be decrypted based on the shared key. In some embodiments, generation of the shared key may be based on a security algorithm negotiated or otherwise known to both the initiating UE and the receiving UE.

Figure 8:
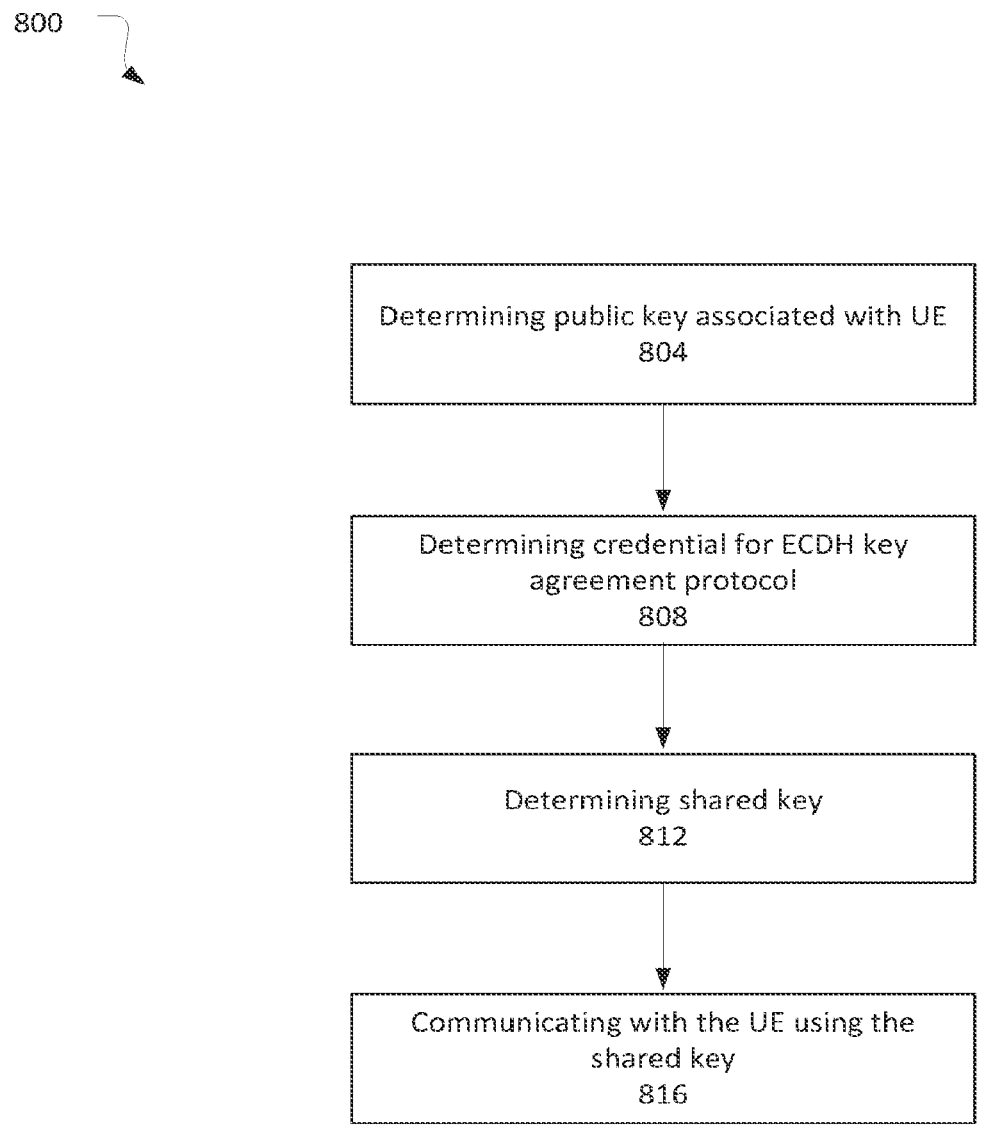
FIG. 8 illustrates an operational flow/algorithmic structure in accordance with some embodiments.

FIG. 8 may include an operation flow/algorithmic structure 800 in accordance with some embodiments. The operation flow/algorithmic structure 800 may be used to establish a secured unicast link between two UES via a relay UE.

In some embodiments, the operation flow/algorithmic structure 800 may be performed by: an initiating UE, for example, UE1 104; a receiving UE, for example, UE2 112; or components thereof, for example, baseband processors of processors 704. For purposes of the present description, the operation flow/algorithmic structure 800 may be considered to be performed by a first UE.

The operation flow/algorithmic structure 800 may include, at 804, determining a public key associated with the second UE. In some embodiments, the public key may be generated by the second UE using security credential information configured to the second UE. The public key of the second UE may be transmitted to the first UE in a direct communication accept message that is part of establishing a peer UE connection through a relay UE.

The operation flow/algorithmic structure 800 may further include, at 808, determining a credential for an ECDH key agreement protocol. In some embodiments, the first UE may determine the security credential based on configuration information provided to the first UE as part of a provisioning process. The provisioning process may include information transmitted to the first UE from a ProSe function of a network.

In some embodiments, the first UE may receive, in a direct communication request message, an indication of a plurality of security credentials that are supported by the second UE. In these embodiments, the first UE may determine which of the security credentials is also supported by the first UE and, if more than one, select one of the mutually supported security credentials. The selected security credential may be communicated back to the second UE.

The operation flow/algorithmic structure 800 may further include, at 812, determining a shared key. The first UE may utilize the security credential, the public key of the second UE, and a private key of the first UE to determine a shared key.

The operation flow/algorithmic structure 800 may further include, at 716, communicating with the second UE using the shared key. The shared key may be used to encrypt communications sent to the second UE and decrypt communications received from the second UE over the secured unicast link that traverses the relay UE.

Figure 9:
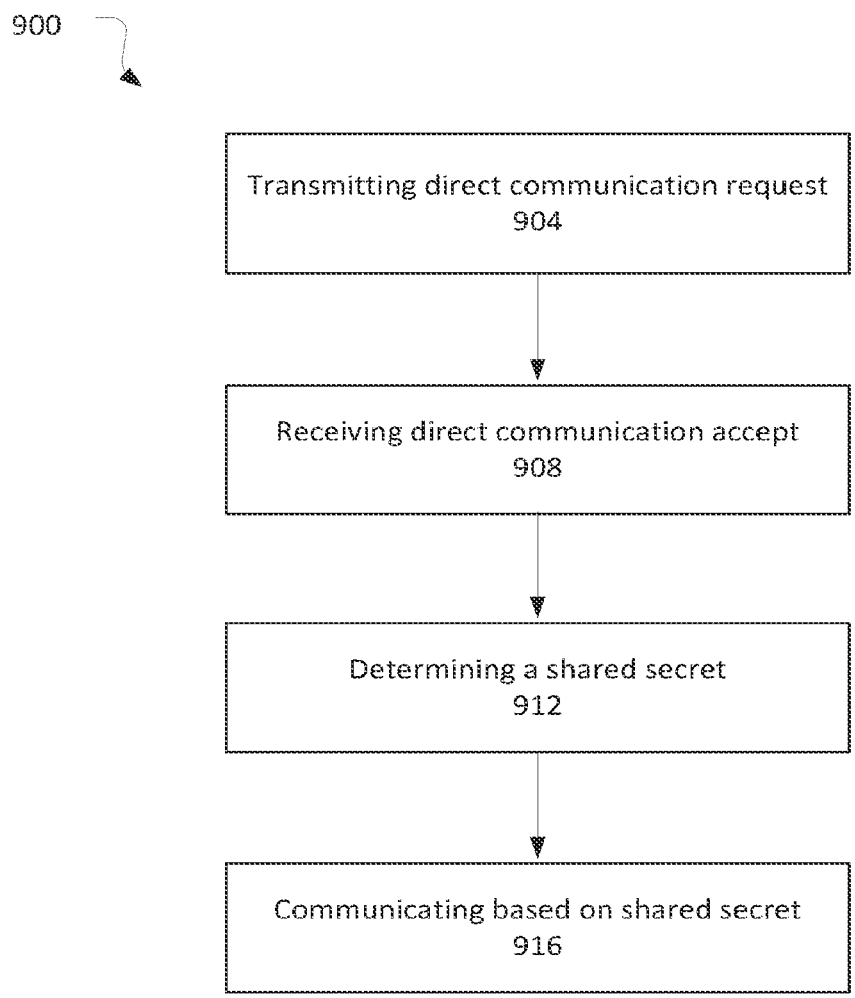
FIG. 9 illustrates an operational flow/algorithmic structure in accordance with some embodiments.

FIG. 9 may include an operation flow/algorithmic structure 900 in accordance with some embodiments. The operation flow/algorithmic structure 900 may be used to establish a secured unicast link between two UEs via a relay UE.

In some embodiments, the operation flow/algorithmic structure 900 may be performed by an initiating UE, for example, UE1 104 or components thereof, for example, baseband processors of processors 704.

The operation flow/algorithmic structure 900 may include, at 904, transmitting a direct communication request message. The direct communication request message may be broadcast to initiate a peer UE discovery process. As described herein, the broadcasting may include setting a destination address as a broadcast L-2 address.

The direct communication request message may include an indication that an ECDH key agreement protocol is to be used to secure communications between the initiating UE and a receiving UE. The direct communication request message may further include a public key associated with the initiating UE. In some embodiments, the direct communication request message may further include a plurality of security credentials of the ECDH key agreement protocol that are supported by the initiating UE.

The operation flow/algorithmic structure 900 may further include, at 908, receiving a direct communication accept message. The direct communication accept message may include a public key associated with the receiving UE. In some embodiments, the direct communication accept message may further include an indication of the selected security credential that is to be used to generate a shared secret.

The operation flow/algorithmic structure 900 may further include, at 912, determining a shared secret. The shared secret may be determined based on the security credential, the public key of the receiving UE, and a private key of the initiating UE.

The operation flow/algorithmic structure 900 may further include, at 916, communicating based on the shared secret. The shared key may be used to encrypt communications sent to the receiving UE and decrypt communications received from the receiving UE over the secured unicast link that traverses a relay UE.

Figure 10:
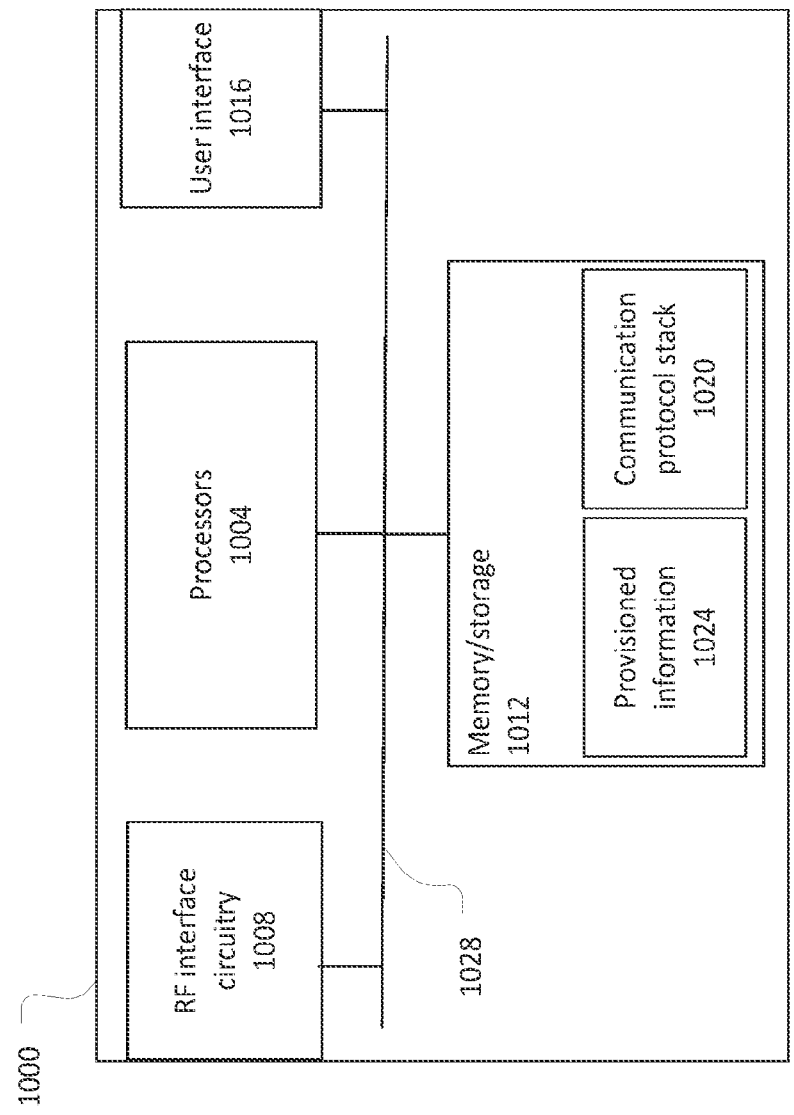
FIG. 10 illustrates a device in accordance with some embodiments.

FIG. 10 illustrates a UE 1000 in accordance with some embodiments. The UE 1000 be similar to and substantially interchangeable with any of the UEs of FIG. 1.

The UE 1000 may be a consumer electronics device, cellular phone, smartphone, tablet computer, wearable computer device, desktop computer, laptop computer, in-vehicle devices (for example, infotainment device, an instrument cluster, a head-up display device, an onboard diagnostic device, dash-top mobile equipment, mobile data terminal, electronic engine management system, electronic/engine control unit, electronic/engine control module, etc.), infrastructure device, sensor, embedded system, microcontroller, control module, networked or (smart) appliance, MTC device, IoT device, and/or the like.

The UE 1000 may include processors 1004, RF interface circuitry 1008, memory/storage 1012, and user interface 1016. The components of the UE 1000 may be implemented as integrated circuits (ICs,) portions thereof, discrete electronic devices, or other modules, logic, hardware, software, firmware, or a combination thereof. The block diagram of FIG. 10 is intended to show a high-level view of some of the components of the UE 1000. However, some of the components shown may be omitted, additional components may be present, and different arrangement of the components shown may occur in other implementations.

The components of the UE 1000 may be coupled with various other components over one or more interconnects 1028, which may represent any type of interface, input/output, bus (local, system, or expansion), transmission line, trace, optical connection, etc. that allows various circuit components (on common or different chips or chipsets) to interact with one another.

The processors 1004 may include processing circuitry such as, for example, an application processor, a digital signal processor, a graphics processing unit, a central processing unit, and/or baseband processors. The processors 1004 may execute or otherwise operate computer-executable instructions, such as program code, software modules, and/or functional processes from memory/storage 1012 to cause the UE 1000 to perform operations as described herein.

In some embodiments, the processors 1004 may access a communication protocol stack 1020 in the memory/storage 1012 to communicate over a SL or 3GPP compatible network as described herein. In some embodiments, the processors 1004 may implement the communication protocol stack 1020 to perform one or more of the operations described with respect to the procedures of FIGS. 2-5, protocol stacks of FIG. 6, or operation flow/algorithmic structures of FIGS. 7-9. In general, the application processor may access the communication protocol stack to perform APP layer functions and baseband processors may access the communication protocol stack to: perform user plane functions at a PHY layer, MAC layer, RLC layer, PDCP layer, SDAP layer, and PDU layer; and perform control plane functions at a PHY layer, MAC layer, RLC layer, PDCP layer, RRC layer, and a non-access stratum (NAS) layer. In some embodiments, the PHY layer operations may additionally/alternatively be performed by the components of the RF interface circuitry.

The baseband processor may generate or process baseband signals or waveforms that carry information in the sidelink or 3GPP-compatible networks. In some embodiments, the waveforms for LTE may be orthogonal frequency division multiplexing (OFDM) in the downlink and single carrier—frequency division multiple access (SC-FDMA) in the uplink. In NR, the waveforms may be based cyclic prefix OFDM (CP-OFDM) in the uplink or downlink, and discrete Fourier transform spread OFDM (DFT-S-OFDM) in the uplink. In LTE advanced (LTE-A) DFT-S-OFDM may be used for the sidelink. In NR, CP-OFDM or DFT-S-OFDM may be used for the sidelink.

The baseband processor may also access information in the provisioned information 1024 in the memory/storage 1012 to establish a secured unicast channel over a relay. As described herein, the provisioned information 1024 may include security credential and key information.

The memory/storage 1012 may include any type of volatile or non-volatile memory that may be distributed throughout the UE 1000. In some embodiments, some of the memory/storage 1012 may be located on the processors 1004 themselves (for example, L1 and L2 cache), while other memory/storage 1012 is external to the processors 1004 but accessible thereto via a memory interface. The memory/storage 1012 may include any suitable volatile or non-volatile memory such as, but not limited to, dynamic random-access memory (DRAM,) static random-access memory (SRAM,) erasable programmable read-only memory (EPROM,) electrically erasable programmable read-only memory (EEPROM,) Flash memory, solid-state memory, and/or any other type of memory device technology.

The RF interface circuitry 1008 may include transceiver circuitry and radio frequency front module (RFEM) that allows the UE 1000 to communicate with other devices over a radio access network. The RF interface circuitry 1008 may include various elements arranged in transmit or receive paths. These elements may include, for example, switches, mixers, amplifiers, filters, synthesizer circuitry, control circuitry, etc.

In the receive path, the RFEM may receive a radiated signal from an air interface via an antenna and proceed to filter and amplify (with a low-noise amplifier) the signal. The signal may be provided to a receiver of the transceiver that down-converts the RF signal into a baseband signal that is provided to the baseband processor of the processors 1004.

In the transmit path, the transmitter of the transceiver up-converts the baseband signal received from the baseband processor and provides the RF signal to the RFEM. The RFEM may amplify the RF signal through a power amplifier prior to the signal being radiated across the air interface via the antennas.

In various embodiments, the RF interface circuitry 1008 may be configured to transmit/receive signals in a manner compatible with LTE or NR access technologies.

The user circuitry 1016 includes various input/output (I/O) devices designed to enable user interaction with the UE 1000. The user interface 1016 includes input device circuitry and output device circuitry. Input device circuitry includes any physical or virtual means for accepting an input including, inter alia, one or more physical or virtual buttons (for example, a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators (for example, binary status indicators such as light emitting diodes (LEDs) and multi-character visual outputs, or more complex outputs such as display devices or touchscreens (for example, liquid crystal displays (LCDs), LED displays, quantum dot displays, projectors, etc.), with the output of characters, graphics, multimedia objects, and the like being generated or produced from the operation of the UE 1000.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

In the following sections, further exemplary embodiments are provided.

Example 1 may include a method of operating a source UE, the method comprising: accessing access provision information to determine a pair of encryption keys associated with the source UE, the pair of encryption keys to include a public key and a private key; broadcasting a direct communication request that includes the public key to trigger a peer UE discovery; receiving, from a target UE, a direct communication accept message that includes a public key associated with the target UE; decrypting communications from the target UE based on the private key associated with the source UE; and encrypt communications to the target UE based on the public key associated with the target UE.

Example 2 may include the method of example one or some other example herein, wherein the method further comprises: transmitting the encrypted communications to the target UE over an end-to-end secured unicast link between the source UE and the target UE.

Example 3 may include the method of example 2 or some other example herein, wherein the end-to-end secured unicast link traverses a relay UE.

Example 4 may include the method of example 3 or some other example herein, wherein the method further comprises: generating a message, with a source Layer-2 identifier that is accessible to the relay UE, to include the encrypted communications.

Example 5 may include the method of example one or some other example herein, further comprising: generating the direct communication request to include a list of supported security algorithms.

Example 6 may include the method of example 5 or some other example herein, further comprising: extracting, from the direct communication accept message, a security algorithm selected by the target UE from the list of supported security algorithms.

Example 7 may include the method of example 6 or some other example herein, further comprising: encrypting communications to the target UE based on the security algorithm; and transmitting the encrypted communications to the target UE via an end-to-end secured unicast link via a UE-to-UE relay.

Example 8 may include the method of example one or some other example herein, further comprising: generating the direct communication request to include an indication that an elliptic-curve Diffie-Hellman (ECDH) key agreement protocol is to be used to secure a unicast link between the source UE and the target UE.

Example 9 may include the method of example 8 or some other example herein, further comprising: generating a shared key based on the ECDH key agreement protocol, the public key associated with the target UE, and the private key associated with the source UE; and encrypting communications to the target UE using the shared key.

Example 10 may include a method of operating a first UE, the method comprising: storing a private key associated with the first UE and a security credential for an elliptic curve Diffie-Hellman (ECDH) key agreement protocol; determining a public key associated with a second UE, and determining a shared key based on the security credential, the public key associated with the second UE, and the private key associated with the first UE.

Example 11 may include the method of example 11 or some other example herein, further comprising transmitting, to the second UE, a direct communication accept message with an indication of the public key associated with the first UE.

Example 12 may include the method of example 10 or some other example herein, wherein the first UE is a target UE, the second UE is a source UE, and the method further comprises: receiving a direct communication request from the source UE, the direct communication request to include an indication of the public key associated with the source UE and an indication of the security credential.

Example 13 may include the method of example 12 or some other example herein, wherein the indication of the security credential is a credential identifier or a name of the security credential.

Example 14 may include the method of example 13 or some other example herein, wherein the indication of the security credential is a credential identifier and the method further comprises: receiving, from a proximity services function in a core network, provisioning information that maps one or more credential identifiers to corresponding one or more credentials; and determining the credential identifier corresponds to the security credential based on the provisioning information.

Example 15 may include the method of example 12 or some other example herein, wherein the direct communication request includes indications of a plurality of security credentials including the security credential and the method further comprises: selecting the security credential based on the security credential being available at the first UE; and including, within a direct communication accept message, an indication of the selection of the security credential.

Example 16 may include the method of example 10 or some other example herein, wherein the first UE is a source UE, the second UE is a target UE, and the method further comprises: generating a direct communication request to include the public key associated with the first UE, and indication that the ECDH key agreement protocol is to be used, and an indication of the security credential; and transmitting the direct communication request to a relay UE.

Example 17 may include a method of operating a first UE, the method comprising: transmitting a direct communication request that includes a public key associated with the first UE and an indication that an elliptic curve Diffie Hellman (ECDH) key agreement protocol is to be used to establish a secure connection; receiving, from a second UE via a relay UE, a direct communication accept message that includes a public key associated with the second UE; and determining a shared secret based on the ECDH key agreement protocol and the public key associated with the second UE.

Example 18 may include the method of example 17 or some other example herein, further comprising: generating the direct communication request to further include an indication of a security credential to be used with the ECDH key agreement protocol.

Example 19 may include the method of example 18 or some other example herein, wherein the indication is a name of the security credential or a credential identifier associated with the security credential.

Example 20 may include the method of example 17 or some other example herein, further comprising: receiving configuration information to configure the first UE with only one security credential to be used with the ECDH key agreement protocol; and determining the shared secret using the one credential with the ECDH key agreement protocol.

Example 21 may include an apparatus comprising means to perform one or more elements of a method described in or related to any of examples 1-20, or any other method or process described herein.

Example 22 may include one or more non-transitory computer-readable media comprising instructions to cause an electronic device, upon execution of the instructions by one or more processors of the electronic device, to perform one or more elements of a method described in or related to any of examples 1-20, or any other method or process described herein.

Example 23 may include an apparatus comprising logic, modules, or circuitry to perform one or more elements of a method described in or related to any of examples 1-20, or any other method or process described herein.

Example 24 may include a method, technique, or process as described in or related to any of examples 1-20, or portions or parts thereof.

Example 25 may include an apparatus comprising: one or more processors and one or more computer-readable media comprising instructions that, when executed by the one or more processors, cause the one or more processors to perform the method, techniques, or process as described in or related to any of examples 1-20, or portions thereof.

Example 26 may include a signal as described in or related to any of examples 1-20, or portions or parts thereof.

Example 27 may include a datagram, information element, packet, frame, segment, PDU, or message as described in or related to any of examples 1-20, or portions or parts thereof, or otherwise described in the present disclosure.

Example 28 may include a signal encoded with data as described in or related to any of examples 1-20, or portions or parts thereof, or otherwise described in the present disclosure.

Example 29 may include a signal encoded with a datagram, IE, packet, frame, segment, PDU, or message as described in or related to any of examples 1-20, or portions or parts thereof, or otherwise described in the present disclosure.

Example 30 may include an electromagnetic signal carrying computer-readable instructions, wherein execution of the computer-readable instructions by one or more processors is to cause the one or more processors to perform the method, techniques, or process as described in or related to any of examples 1-20, or portions thereof.

Example 31 may include a computer program comprising instructions, wherein execution of the program by a processing element is to cause the processing element to carry out the method, techniques, or process as described in or related to any of examples 1-20, or portions thereof.

Example 32 may include a signal in a wireless network as shown and described herein.

Example 33 may include a method of communicating in a wireless network as shown and described herein.

Example 34 may include a system for providing wireless communication as shown and described herein.

Example 35 may include a device for providing wireless communication as shown and described herein.

Any of the above-described examples may be combined with airy other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Although the embodiments above have been described in considerable numerous variations and modifications will become apparent to those skilled in the art once the above disclosure is fully appreciated. It is intended that the following claims be interpreted to embrace all such variations and modifications.

What is claimed is:

1. One or more non-transitory computer-readable media having instructions that, when executed by one or more processors, cause a source user equipment (UE) to:
   access provision information to determine a pair of encryption keys associated with the source UE, the pair of encryption keys to include a public key and a private key;
   broadcast, by the source UE, a direct communication request that includes the public key to trigger a peer UE discovery;
   receive, from a target UE, a direct communication accept message that includes a public key associated with the target UE;
   decrypt communications from the target UE based on the private key associated with the source UE; and
   encrypt communications to the target UE based on the public key associated with the target UE.

2. The one or more non-transitory computer-readable media of claim 1, wherein the instructions, when executed, further cause the source UE to:
   transmit the encrypted communications to the target UE over an end-to-end secured unicast link between the source UE and the target UE.

3. The one or more non-transitory computer-readable media of claim 2, wherein the end-to-end secured unicast link traverses a relay UE.

4. The one or more non-transitory computer-readable media of claim 3, further comprising:
   generate a message, with a source Layer-2 identifier that is accessible to the relay UE, to include the encrypted communications.

5. The one or more non-transitory computer-readable media of claim 1, wherein the instructions, when executed, further cause the source UE to:
   generate the direct communication request to include a list of supported security algorithms.

6. The one or more non-transitory computer-readable media of claim 5, wherein the instructions, when executed, further cause the source UE to:
   extract, from the direct communication accept message, a security algorithm selected by the target UE from the list of supported security algorithms.

7. The one or more non-transitory computer-readable media of claim 6, wherein the instructions, when executed, further cause the source UE to:
   encrypt communications to the target UE based on the security algorithm; and
   transmit the encrypted communications to the target UE via an end-to-end secured unicast link via a UE-to-UE relay.

8. The one or more non-transitory computer-readable media of claim 1, wherein the instructions, when executed, further cause the source UE to:
   generate the direct communication request to include an indication that an elliptic-curve Diffie-Hellman (ECDH) key agreement protocol is to be used to secure a unicast link between the source UE and the target UE.

9. The one or more non-transitory computer-readable media of claim 8, wherein the instructions, when executed, further cause the source UE to:
   generate a shared key based on the ECDH key agreement protocol, the public key associated with the target UE, and the private key associated with the source UE; and
   encrypt communications to the target UE using the shared key.

10. A first user equipment (UE) comprising:
    memory circuitry to store a private key associated with the first UE and a security credential for an elliptic curve Diffie-Hellman (ECDH) key agreement protocol; and
    processing circuitry, coupled with the memory circuitry, the processing circuitry to:
    determine, at the first UE, a public key associated with a second UE; and determine, at the first UE, a shared key based on the security credential, the public key associated with the second UE, and the private key associated with the first UE.

11. The first UE of claim 10, wherein the processing circuitry is further to:
transmit, to the second UE, a direct communication accept message with an indication of the public key associated with the first UE.

12. The first UE of claim 10, wherein the first UE is a target UE, the second UE is a source UE, and the processing circuitry is further to:
receive a direct communication request from the source UE, the direct communication request to include an indication of the public key associated with the source UE and an indication of the security credential.

13. The first UE of claim 12, wherein the indication of the security credential is a credential identifier or a name of the security credential.

14. The first UE of claim 13, wherein the indication of the security credential is a credential identifier and the processing circuitry is further to:
receive, from a proximity services function in a core network, provisioning information that maps one or more credential identifiers to corresponding one or more credentials; and
determine, the credential identifier corresponds to the security credential based on the provisioning information.

15. The first UE of claim 12, wherein the direct communication request includes indications of a plurality of security credentials including the security credential and the processing circuitry is further to:
select the security credential based on the security credential being available at the first UE; and
include, within a direct communication accept message, an indication of the selection of the security credential.

16. The first UE of claim 10, wherein the first UE is a source UE, the second UE is a target UE, and the processing circuitry is further to:
generate a direct communication request to include the public key associated with the first UE, and indication that the ECDH key agreement protocol is to be used, and an indication of the security credential; and
transmit the direct communication request to a relay UE.

17. A method of operating a first user equipment (UE,) the method comprising:
transmitting, by the first UE, a direct communication request that includes a public key associated with the first UE and an indication that an elliptic curve Diffie Hellman (ECDH) key agreement protocol is to be used to establish a secure connection;
receiving, from a second UE via a relay UE, a direct communication accept message that includes a public key associated with the second UE; and
determining a shared secret based on the ECDH key agreement protocol and the public key associated with the second UE.

18. The method of claim 17, further comprising: generating the direct communication request to further include an indication of a security credential to be used with the ECDH key agreement protocol.

19. The method of claim 18, wherein the indication is a name of the security credential or a credential identifier associated with the security credential.

20. The method of claim 17, further comprising:
receiving configuration information to configure the first UE with only one security credential to be used with the ECDH key agreement protocol; and
determining the shared secret using the one credential with the ECDH key agreement protocol.

* * * * *